United States Patent Office 3,331,805
Patented July 18, 1967

3,331,805
BINDER COMPOSITION OF A POLYMERIC COMPONENT, AN EPOXY RESIN AND AN ALKYLATED MELAMINE FORMALDEHYDE RESIN
Zoltan Mandel, Wilmington, Del., assignor to E. I. du Pont de Nemours and Company, Wilmington, Del., a corporation of Delaware
No Drawing. Continuation of application Ser. No. 86,279, Feb. 1, 1961. This application Apr. 29, 1966, Ser. No. 546,185
1 Claim. (Cl. 260—39)

This application is a continuation of my application Ser. No. 86,279, filed Feb. 1, 1961, and now abandoned.

The present invention relates to a novel elastomeric resin binder composition and to novel structures containing this composition.

The present invention has particular utility in the preparation of non-woven fabrics. Such fabrics are usually formed by a random or controlled deposition of filamentary strands either staple fibers or continuous, to form a sheet or batt followed by binding the strands to provide strength and dimensional stability. It is often desirable to produce the non-woven fabric in a form having a fairly close resemblance to woven fabrics in softness, handle and drape, while providing excellent durability to washing and exposure to ultraviolet light and sunlight. The composition of the present invention when used in a manner disclosed more fully below, results in such a superior non-woven fabric product.

In addition to their use as binding agents for non-woven fabrics, the binder formulations of this invention may be used in other ways. For example, they may be used in dispersion form as surfacing agents or coating agents to be applied to woven or non-woven fabrics. When applied as surfacing agents to non-woven fabrics which have already been bonded by other means, there results a material which has a smooth and permanent surface and a remarkably good freedom from pickiness or loosening of individual filaments. These compositions, of course, can also be used in combination with other bonding agents.

While use of the binder formulations of this invention gives non-woven fabrics having outstanding tensile strength, drapability, softness and retention of properties on exposure to hot water or organic solvents, it is also true that such non-woven fabrics show excellent resistance to pilling, fuzzing and distortion by long-term creep. They are highly wrinkle-resistant, readily embossed by known treatments and readily dyeable. They are also highly stable to light and are good in their resistance to soiling and in the ease with which the soil can be removed from the fabric.

Non-woven fabrics employing the binders of this invention show excellent wash-wear behavior, have a high degree of air-permeability equivalent to woven fabrics and are completely devoid of any tendency to develop allergic reaction or toxicity effects in the wearer.

The resin binder composition may be prepared in the form of particles called fibrids, or in the form of a dispersion or a solution, crystalline particles or in any other physical form well known to those skilled in the art.

The term "fibrid" is employed herein to designate a non-rigid, wholly synthetic polymeric particle capable of forming paper-like structures. Thus, to be designated a "fibrid," a particle must possess an ability to form a waterleaf having a couched wet tenacity of at least about 0.002 gram per denier when a multitude of the said particles are deposited from a liquid suspension upon a screen, which waterleaf, when dried at a temperature below about 50° C., has a dry tenacity at least equal to its couched wet tenacity, and a capability, when a multitude of the said particles are deposited concomitantly with staple fibers from a liquid suspension upon a screen, to bond a substantial weight of the said fibers by physical entwinement of the said particles with the said fibers to give a composite waterleaf with a wet tenacity of at least about 0.002 gram per denier.

Fibrid particles and their preparation are described in more detail in Belgian Patent 564,206 and copending and coassigned U.S. application Ser. No. 788,371, now U.S. 2,999,788. Fibrids can be prepared from a number of polymeric compositions, and such fibrids can be used in the present invention, leading to a spectrum of fabrics as indicated above.

The binder composition of the present invention comprises a number of essential ingredients in critical proportions. Present in a major amount is an addition polymeric component having a molecular weight generally exceeding 5000. This linear copolymer contains repeating units of at least two different monomers. One of these monomers is present in a major amount, i.e., above 50% by weight and is a monoethylenically unsaturated organic ester having from 4–9 carbon atoms in the molecule. The ester may be a vinyl or acrylic ester such as ethyl acrylate (5 carbon atoms), methyl acrylate (4 carbon atoms) and vinyl acetate, 4 carbon atoms) and mixtures thereof. It is exemplified by monoethylenically unsaturated esters having from 4–9 carbon atoms and being of the formula

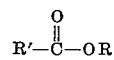

wherein R and R' are hydrocarbon of from 1 to 7 carbons at least one of which (preferably R') is unsaturated. The other required monomer which provides a repeating unit is an unsaturated carboxylic acid such as acrylic, methacrylic, itaconic or maleic acid. This unit is present in the polymer to the extent of about 1 to 5% by weight and preferably 1–3%. Minor amounts of higher, i.e., above 9 carbon atoms, monoethylenically unsaturated ester such as ethylhexyl acrylate may also be present. Thus up to 50% of the lower esters in the copolymer may be replaced by the higher esters.

Exemplary polymeric components are composed as follows: (a) ethyl acrylate 92%, methyl acrylate 6% and acrylic acid 2%, (b) vinyl acetate 54%, dibutyl maleate 22%, 2-ethylhexyl acrylate 22% and acrylic acid 2%, (c) vinyl acetate 50% cellulose acrylate 47% and acrylic acid 3%, (d) vinyl acetate 55%, butyl acrylate 42% and acrylic acid 3%, (e) vinyl acetate 48%, butyl acrylate 26%, ethyl acrylate 25% and acrylic acid 1%, and (f) vinyl acetate 40%, ethyl acrylate 59% and acrylic acid 1%.

The binder of the present invention contains besides the linear copolymer a 2-component cross-linking system containing about equal amounts by weight of an alkylated melamine-formaldehyde resin and a diepoxide resin. Preferably the diepoxide resin is a monomeric bisglycidyl ether of diphenylol propane having an epoxy equivalent of 175–210, although other diepoxide resins in similar quantities will produce analogous results. For an optimum balance of properties the preferred formulations are those having from 0.5 to 1.7 epoxy equivalents per mole of carboxylic acid in the resin polymer. The melamine-formaldehyde resin contains one part of melamine to 3–5 parts of formaldehyde and is alkylated with either methyl ethyl, propyl or butyl substituents, i.e., 1–4 carbon atom alkyl groups and preferably butylated melamine-formaldehyde resin is employed. In those instances where vinyl acetate is used in proportions of over 30%, it has been found that the inclusion of small amounts of butyl phosphoric acid tends to accelerate the cross-linking. The 2-component cross-linking system is found to give unexpectedly superior qualities with regard to stiffness of fabrics over the use of either component by itself. The combined weight of the cross-linking agents should be at least 10% and preferably not over 20% of the weight of the copolymer.

Only with the specific combination of ingredients mentioned above which constitute this invention has it been possible to achieve a non-woven fabric exhibiting both good washability and good dry-cleaning performance.

An inorganic pigment such as barium sulfate, titanium dioxide, hydrated silica or an inorganic silicate can be present in the binder. It has been unexpectedly and surprisingly found that its use gives non-woven fabrics having a softer, drier hand, while the strength, flexibility and durability are not diminished. The weight of the pigment must be at least 5% to attain these advantages and preferably between about 10 and 20% of the polyester. Barium sulfate is the preferred pigment.

While synthetic fiber non-woven webs are particularly amenable to treatment with the binder composition of the invention it is equally possible to employ natural fibers, such as cotton or cellyosic fibers and filaments such as rayon, or cellulose acetate and to associate them into a fabric with the novel binder.

The resins of this invention can be employed in conventional curing processes which utilize salt coagulation baths prior to curing. However, in addition it is possible and frequently highly convenient to add an inorganic salt such as magnesium sulfate or sodium sulfate to the binder formulation prior to its application to a non-woven fabric. Coagulation in situ is then obtained by the application of heat, without the necessity of salt bath coagulation. This can reduce any tendency of the resin to migrate or wash off. Preferably a quantity of inorganic salt equal to about 1–3% by weight of the aqueous resin dispersion can be applied.

The binder formulations of this application permit the production of soft drapable non-woven fabrics which are equivalent to apparel fabrics. This high degree of drapability can be obtained by making use of the spontaneous elongation principle in the fiber component. A "self-elongatable fiber" may be defined as one which upon suitable thermal treatment, exhibits an internally generated increase in length of from 3% up to 25% of its original length. However, as binder materials, the formulations of this invention function equally well for conventional fibers, either polyamide, polyester or other composition, straight, crimped, etc.

*Example I*

Spontaneously elongatable fibers of polyethylene terephthalate are prepared in accordance with the teaching of Belgian Patent 556,145 in the following manner. Polyethylene terephthalate is spun at 295° C. through a spinneret having 27 orifices, each 0.009 inch in diameter, and the resulting filaments are collected into a yarn which is wound up at a speed of 1200 yds./min. The yarn is found to have a denier as-spun of 135 (15 tex.), a birefringence of 0.0094 and a crystallinity level which indicates it is substantially amorphous. The yarn is passed from the feed roll to a bath of water maintained at 20° C. to a draw roll, after which it is wound up on a suitable package. The yarn speed at the draw roll is 400 yds./min. The draw ratio is 2.80. The birefringence of the drawn yarn is 0.1902. Immediately following the drawing treatment, the drawn yarn is immersed in water at 70° C. for a period of 5 minutes. During this process the yarn shrinks 38.3% of its original length. Following this treatment, the yarn is dried and is then found to be spontaneously elongatable. The spontaneous elongation is tested by immersing a measured length of the yarn in water at 90° C. for 5 minutes. This treatment causes the yarn to increase in length by 9.3% of its original length. The fibers have a modulus of about 20.

In similar preparations, involving variations of crystallinity, draw ratio, and thermal treatment, similar polyester fibers are obtained which exhibit spontaneous elongation amounting to as much as 29%. This yarn is suitable for cutting into staple lengths for further processing as described below in accordance with the teaching of the present invention.

*Example II*

A dispersion in water of an elastomer terpolymer containing by analysis 92% ethyl acrylate, 6% methyl acrylate, and 2% acrylic acid, 46% solids, is converted to highly stable fibrids as follows:

To a quantity of the dispersion containing 100 parts of elastomer is added 5 parts monomeric bisglycidyl ether of diphenylol propane having an epoxy equivalent of 175–210, and 5 parts of a butylated melamine-formaldehyde resin containing one part melamine to 3–5 parts formaldehyde (Uformite MM–46, sold by Rohm and Haas Company), and 5 parts of titanium dioxide pigment.

The compounded mixture is converted to fibrids by shear precipitating techniques, that is, by adding the resin blend to a Waring Blendor containing a 5% solution of sodium sulfate in hot water with 0.01% of a polyether alcohol wetting agent. The Blendor is operated at full speed during the addition. The resulting fibrids are used in the form of the slurry as prepared.

A slurry of 3 parts of staple fibers (¼ inch long, 3 denier (0.3 tex.)) prepared as in Example I and having a spontaneous elongation of about 10% when treated with boiling water, and 2 parts of the fibrids in 10,000 parts of water is prepared and a waterleaf is formed in the manner already described. The sheet is removed from the screen, placed between a cotton cloth sheet and a 12-mesh wire screen, and dried at 120° C. for 3 minutes. The dried sheet is then placed between 50-mesh screens and embossed and bonded at 205° C. for one minute at 200 p.s.i. The sheet is further cured by exposing to air at 165° C. for 5 minutes. The sheet is washed and tumble dried before testing. The fabric contains 40% elastomeric binder which has a modulus of 0.01 g./den. before curing and 0.015 after curing. It has a dry tensile strength of 5.9 lbs./in./oz./yd.$^2$, a basis weight of 3.5 oz./yd.$^2$, a drape stiffness of 0.75 inch, and a wet tensile strength of 4.5 lbs./in./oz./yd.$^2$ Under microscopic examination, it is seen that the individual fibers are highly crimped and convoluted, having 60–80 c.p.i., and a "free-fiber length" of about 1.6 times the shortest distance between adjacent bonding sites. By the term "free-fiber length" is meant the length of any fiber portion, between points of bonding of that fiber with other fibers, measured while that fiber portion is extended sufficiently to remove any crimp or loops therein. The fabric is found to have good strength retention when exposed to dry-cleaning solvents or to washing. The embossing treatment produces a fabric resembling Oxford cloth in appearance, with excellent whiteness, good retention of whiteness, medium porosity and good handle.

*Example III*

Poly(ethylene terephthalate) continuous filaments were spun from a 34-hole spinneret to give a non-woven web of polyester fibers. The web consisted of individually disposed, random-oriented filaments deposited through an air jet which forwarded the filaments from the spinneret over a chromic oxide charging bar which caused the generation of a static electrical charge in individual fibers as described in copending and coassigned application Ser. No. 859,614 filed by George A. Kinney on Dec. 15, 1959 and now abandoned. The homopolymer poly(ethylene terephthalate) was spun under conditions to give filaments with controlled orientation to give from 25–55% shrinkage on treatment with 75° C. water for one minute. A compounded dispersion of the acrylate terpolymer resin of Example II but containing 7.5 parts of each of the cross-linking agents and 10 parts of barium sulfate in water was applied to the web to provide a binder content of 30% by weight based on the total fabric. Following web formation, the non-woven material was shrunk at controlled dimensions (on a tenter frame) to allow an area shrinkage of 50%, by treatment with 105° C. air with residence time of one minute. The filaments of the web were then found to be spontaneously elongatable, the average filament showing an elongation of 11% on treatment with boiling water for five minutes.

The web after shrinkage, was bonded and the filaments were simultaneously elongated by pressing the web between 50-mesh screens at 215° C. for one minute with a pressure of 200 p.s.i. The resulting material was a soft, flexible, non-woven fabric having a textile pattern imposed by the embossing function of the screens. The fabric had a tensile strength of 6.5 lb./in./oz./yd.$^2$, an elongation of 114%, and a drape stiffness of 2.6 cm. at a basis weight of 3.8 oz./yd.$^2$ Tenacity of the fabric after treatment with a boiling solution of synthetic detergent for 30 minutes was 5.4 lb./in./oz./yd.$^2$ Another sample of the same fabric after immersion in perchloroethylene solvent had a tenacity of 3.4 lb./in./oz./yd.$^2$

*Example IV*

A terpolymer was prepared from 50 parts of vinyl acetate, 48.5 parts butyl acrylate and 1.5 parts acrylic acid. Following the procedure of Example II, 100 parts of this resin were used with 7.5 parts of the diepoxide resin, and 7.5 parts of butylated melamine formaldehyde resin, and 10 parts of BaSO$_4$. The compounded resin was fibridated as described in Example II, and a non-woven fabric was prepared following the procedure of that example. The fabric had a basis weight of 3.73 oz./yd.$^2$, a tenacity of 5.6 lb./in./oz./yd.$^2$, drape stiffness of 2.2 cm., and excellent wash and dry-clean-retention of strength.

Additional examples of binder formulations are given in Table I of this specification. These formulations were used for bonding non-woven fabrics as shown in Table II of the specification. The fabrics were all composed of 60 parts of fiber and 40 parts of binder by weight. All the fabrics were embossed as shown in the earlier examples using wire screens. The constitution of the fibers is indicated in the table.

Drape was measured in two ways. The first value given is drape stiffness in centimeters. It was measured by determining the length of fabric which is necessary to cause the fabric to bend for the horizontal plane when under no constraint to such an extent to contact the declining angle of 41.5° of slope from the point of departure of contact. A strip of fabric one inch wide is placed upon a block of wood or other horizontal surface. Abutting the horizontal surface of this material is a 41.5° inclined plane, which at its top adjoins the horizontal surface. The test specimen is placed with the narrow edge at the juncture of the horizontal and inclined surfaces. It is then moved over the inclined surface until the free end touches the 41.5° slope of the testing block. The drape stiffness is measured in inches, beyond one half of the free length of specimen extending beyond the horizontal surface edge.

A second method of measuring drape is the "Hanging Heart" test value in centimeters. The Hanging Heart test is the measure of fabric drapability based upon considerations described in an article by F. T. Pierce, J. Text. Institute, 21, T–377–416 (1930). A sample of fabric 6½ inches long and one inch wide is employed to form a heart-shaped loop, the two free ends of the strip being clamped in contact with each other to form the cusp of a cardioid figure. The loop of the fabric is allowed to hang down vertically, and the distance from the cusp to the lowest point of the loop is measured. From this, the bending length is calculated as described by Pierce's equations.

Table I sets forth the binder formulations designated A–L. Binders A–D are outside the scope of the instant application and are included to show the substantial improvement obtained with the preferred formulations of the invention. Binders H, K, and L are also outside the scope of the invention. Resins E, F, G, and J show the preferred formulations of this invention. The evidence as presented in Table II shows that superior fabric properties are obtained only with the specific combinations of the invention. The areas in which the binder formulations give superior results are tensile strength and tear strength after prolonged immersion in boiling detergent solution and after immersion in perchloroethylene and similar solvents. Most important, these binder formulations give fabrics with excellent drape, good hand and outstanding washability as measured by retention of strength after extended washing according to AATCC standards. These fabrics which may contain from 1–60% of binder based

TABLE I.—BINDER FORMULATIONS

| Binder Desig. | Elastomer Composition | | Cross linking Agent | | Pigment | |
|---|---|---|---|---|---|---|
| | Component | Parts | Component | Parts | Type | Parts |
| A | Ethyl Acrylate<br>Methyl Acrylate<br>Acrylic Acid | 92<br>6<br>2 | None | | None | |
| B | Ethyl Acrylate<br>Methyl Acrylate<br>Acrylic Acid | 92<br>6<br>2 | None | | TiO$_2$ [1] (contains active sites). | 5 |
| C | Ethyl Acrylate<br>Methyl Acrylate<br>Acrylic Acid | 92<br>6<br>2 | Diepoxide [2] | 10 | TiO$_2$ (contains no active sites). | 5 |
| D | Ethyl Acrylate<br>Methyl Acrylate<br>Acrylic Acid | 92<br>6<br>2 | (Butylated) Melamine form aldehyde resin (Uformite MM–46). | 10 | TiO$_2$ | 5 |
| E | Ethyl Acrylate<br>Methyl Acrylate<br>Acrylic Acid | 92<br>6<br>2 | Diepoxide [2]<br>Bu-m-f resin Uformite MM–46. | 5<br>5 | TiO$_2$ | 5 |
| F | Ethyl Acrylate<br>Methyl Acrylate<br>Acrylic Acid | 92<br>6<br>2 | Diepoxide [2]<br>Bu-m-f resin Uformite MM–46. | 7.5<br>7.5 | TiO$_2$ | 5 |
| G | Ethyl Acrylate<br>Methyl Acrylate<br>Acrylic Acid | 92<br>6<br>2 | Diepoxide [2]<br>Bu-m-f resin Uformite MM–46. | 7.5<br>7.5 | BaSO$_4$ | 10 |
| H | Ethyl Acrylate<br>Methyl Acrylate | 94<br>6 | Diepoxide [2]<br>Bu-m-f resin Uformite. | 7.5<br>7.5 | BaSO$_4$ | 10 |
| J | Ethyl Acrylate<br>Vinyl Acetate<br>Acrylic Acid | 51<br>47<br>2 | Diepoxide [2]<br>Bu-m-f resin | 5<br>5 | TiO$_2$ | 5 |
| K | Styrene<br>Butadiene | 55<br>45 | None | | TiO$_2$ [1]<br>ZnO | 5<br>5 |
| L | Ethylene<br>Vinyl Acetate<br>Vinyl Alcohol | 60<br>38<br>2 | Bu-m-f resin | | None | |

[1] This TiO$_2$ pigment contains other oxides suitable for ionic cross linking.
[2] This diepoxide is the monomeric bisglycidyl ether of diphenylolpropane having an epoxy equivalent of 175–210.

on the total weight of the fabric have a soft apparel-like feel and excellent retention of whiteness. Preferred fabrics will have an original tensile strength of at least 5 lb./in./oz./yd.$^2$, a hot wet tensile greater than 3.0 and equal to at least ½ the original tensile, a tear strength of at least 0.8 lb./oz./yd.$^2$, and a high tenacity retention on washing (>50%) and on treatment with solvents.

While the examples show a number of fabrics having excellent drapability and strength, it is of course, quite possible to use these binder formulations in other fabric constructions which might not have such good drape. Examples 18 and 19 show such utility. Further these binders are used not only for bonding non-woven fabrics but also for application of pigments to fabrics either woven or non-woven. In such application as little as 1% by weight of binder based on the fabric may be satisfactory.

the fibers in the fabric elongated and crimped spontaneously. The fabric contained 34% of the binder formulation and had the following physical properties:

Fabric weight _____oz./yd.$^2$__ 4.10
Thickness _____mils__ 15.6
Bending length _____cm__ 2.79
Bending modulus _____p.s.i__ 847
Vibrational modulus _____p.s.i__ 1230
Tensile strength, dry _____lb./in./oz./yd.$^2$__ 8.8
"Tide" tensile strength _____lb./in./oz./yd.$^2$__ 5.5
Tongue tear strength _____lb./oz./yd.$^2$__ 2.1

Other salts that have been used are sodium sulfate, magnesium chloride and magnesium sulfate. The concentrations will vary between 1.5 and 10% depending upon the salt and the solids content of the emulsion, e.g., with higher solids content a lower salt concentration is needed.

TABLE II.—NON-WOVEN FABRICS BONDED WITH VARIOUS BINDER FORMULATIONS

| Ex. | Binder Component | | Fiber | Weight of Fabric, oz./yd.$^2$ | Sheet Tensile/Strength [1] | | | Tear Strength [2] | Drape [5] | Washability [3] Tenacity Retain, Percent |
|---|---|---|---|---|---|---|---|---|---|---|
| | Desig. | Form | | | Orig. | Hot Wet [4] | In Perchloroethylene | | | |
| 5 | A | Fibrids | W | 3.5 | 3.8 | 1.0 | Zero | 1.0 | 2.3 | Zero |
| 6 | B | do | W | 3.5 | 5.7 | 0.5 | 0.6 | 1.2 | 2.5; 1.8 | Zero |
| 7 | C | do | W | 3.5 | 3.5 | 1.9 | 0.8 | | 2.0 | Zero |
| 8 | D | do | W | 3.5 | 5.5 | 2.5 | 2.4 | 0.7 | 2.4 | 10 |
| 9 | E | do | W | 3.5 | 5.5 | 3.5 | 2.3 | 0.85 | 2.2 | 60 |
| 10 | F | do | W | 3.5 | 5.5 | 4.0 | 2.4 | 0.82 | 2.3 | 60 |
| 11 | G | do | W | 3.6 | 5.1 | 3.5 | 1.8 | 0.9 | 2.0 | 64 |
| 12 | H | do | W | 3.5 | 1.6 | 1.2 | <0.3 | | 1.8 | |
| 13 | J | Dispersion | X | 2.9 | 7.8 | 4.4 | 4.1 | 1.9 | 2.2 | 60 |
| 14 | K | Fibrids | W | 3.5 | 4.0 | <2.0 | Low | 1.15 | 2.0 | Fair |
| 15 | L | do | W | 3.5 | 7.0 | Weak | 0.57 | | | |
| 16 | E | Dispersion | X | 2.8 | 5.2 | | | | 2.3 | 2.0 |
| 17 | E | do | X | | 7.4 | | | | | 2.4 |
| 18 | G | do | X | 3.5 | 7.0 | 3.8 | 3.0 | 2.0 | 3.0; 2.4 | |
| 19 | F | Fibrids | Y | 6.0 | 8.0 | 4.5 | 3.0 | 3.0 | 4.0 | |

[1] Strength values in lb./in./oz./yd.$^2$
[2] Tear strength in lb./oz./yd.$^2$
[3] Percent tensile strength retained after 21 hrs. of the standard AATCC wash cycle.
[4] Boiling synthetic detergent solution immersion for 30 mins. before testing.
[5] First value is drape stiffness. Second value is "Hanging Heart" determination.
"W"—Polyester fibers of Example I, 3 d.p.f. (0.3 tex.) ¼" staple.
"X"—Polyester continuous filaments of Example III.
"Y"—Polyamide (66 nylon) staple fibers, 4.5 d.p.f., (0.5 tex.) ¼".
"Z"—Polyamide (66 nylon) continuous filaments.

The following example illustrates a process of coagulation in situ by the addition of a salt to a dispersion form of binder component followed by the application of heat.

*Example XX*

A web of polyethylene terephthalate fibers having a shrinkability of 38% in length in 75° C. water, was prepared and consolidated between sheets of kraft paper in a press at 50° C. under a pressure of 350 p.s.i. for 30 seconds. The faces of the press comprised 30 x 30 mesh screens. The web was impregnated by dipping it into a 20% solids dispersion of a binder formulation in water. The binder formulation comprised 20 parts by weight of barium sulfate, 7½ parts by weight of a butylated melamine formaldehyde resin containing one part melamine to 3–5 parts formaldehyde and 7½ parts by weight of monomeric bisglycidyl ether of diphenylol propane having an epoxy equivalent of 175 to 210, and 100 parts of an elastomer terpolymer containing by analysis 92% ethyl acrylate, 6% methyl acrylate and 2% acrylic acid. The dispersion contained 10% by weight of sodium chloride. Excess dispersion was removed by passing the web between squeeze rolls. The web was held in a tenter frame and placed in a steam chest for 15 seconds to coagulate the binder and to shrink the web 25% linearly. The sheet was then rinsed in water to remove sodium chloride, dried at 70° C., and then bond-embossed between 40 x 40 mesh screens at 210° C., 100 p.s.i. for 60 seconds while Divalent salts ($SO_4^=$, $Mg^{++}$) can be used at lower levels.

The binder formulations of the invention provide a convenient vehicle for dyeing of bonded fabrics particularly non-woven fabrics of synthetic fiber materials. For example, the cross-linking agents of the binder formulations are capable of being preferentially dyed. In addition the acid component of the copolymer may serve as a source of a substitutent which is reactive with particular dyestuffs. If desired, other dye receptive components such as polyvinyl pyrrolidone or other acidic or basic dye receptors can be added to the binder formulations.

What is claimed is:

A binder composition comprising (1) a major amount of a polymeric component of about 50 parts of vinyl acetate, about 48.5 parts of butyl acrylate and about 1.5 parts of acrylic acid; (2) from about 10–20% by weight based on component (1) of a mixture in equal weight proportions of alkylated melamine formaldehyde resin and a diepoxide resin; and (3) from 5–20% by weight based on component (1) of barium sulfate.

References Cited

UNITED STATES PATENTS 2,823,142   2/1958   Sumner et al. _____ 260—844
2,999,788   9/1961   Morgan _____ 162—146
3,105,826   10/1963  Jaggard _____ 260—834

MORRIS LIEBMAN, *Primary Examiner.*

L. T. JACOBS, *Assistant Examiner.*